US009606418B2

(12) United States Patent
Lin

(10) Patent No.: US 9,606,418 B2
(45) Date of Patent: Mar. 28, 2017

(54) LIQUID CRYSTAL GRATING SUBSTRATE, LIQUID CRYSTAL GRATING AND DISPLAY DEVICE

(71) Applicant: BOE TECHNOLOGY GROUP CO., LTD., Beijing (CN)

(72) Inventor: Chiachiang Lin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 91 days.

(21) Appl. No.: 14/416,478

(22) PCT Filed: May 21, 2014

(86) PCT No.: PCT/CN2014/077983
§ 371 (c)(1),
(2) Date: Jan. 22, 2015

(87) PCT Pub. No.: WO2015/089988
PCT Pub. Date: Jun. 25, 2015

(65) Prior Publication Data
US 2016/0062209 A1  Mar. 3, 2016

(30) Foreign Application Priority Data

Dec. 18, 2013 (CN) .......................... 2013 1 0701562

(51) Int. Cl.
*G02F 1/1343* (2006.01)
*G02F 1/29* (2006.01)
*G02F 1/1339* (2006.01)

(52) U.S. Cl.
CPC ............ *G02F 1/292* (2013.01); *G02F 1/1339* (2013.01); *G02F 1/13439* (2013.01); *G02F 1/134363* (2013.01)

(58) Field of Classification Search
CPC ............ G02F 1/1339; G02F 1/134363; G02F 2001/134318; G02B 27/22; G02B 27/2214
(Continued)

(56) References Cited

U.S. PATENT DOCUMENTS

2007/0146233 A1* 6/2007 Lee .................... H04N 13/0025
345/6
2013/0088680 A1 4/2013 Sakurai et al.

FOREIGN PATENT DOCUMENTS

CN       1696803 A      11/2005
CN       201796217 U    4/2011
(Continued)

OTHER PUBLICATIONS

Second Office Action regarding Chinese application No. 201310701562.4, dated Jan. 19, 2016. Translation provided by Dragon Intellectual Property Law Firm.
(Continued)

*Primary Examiner* — Kendrick Hsu
(74) *Attorney, Agent, or Firm* — Harness, Dickey & Pierce, P.L.C.

(57) ABSTRACT

The liquid crystal grating substrate includes a base substrate, and several bar-like signal electrodes and several bar-like common electrodes formed at an identical layer on the base substrate. The signal electrodes and the common electrodes are arranged alternately and parallel to each other. The liquid crystal grating substrate further includes a signal electrode input line connected to a first end of the signal electrode and a common electrode input line connected to a second end of the common electrode. Respective first ends of the signal electrode and the common electrode are arranged close to one side of the base substrate, respective second ends of the signal electrode and the common electrode are arranged close to the other side of the base substrate opposite to the
(Continued)

side, and the signal electrode input line and the common electrode input line are arranged at a layer identical to the signal electrode.

10 Claims, 2 Drawing Sheets

(58) Field of Classification Search
USPC .......................................... 349/15, 153, 141
See application file for complete search history.

(56) References Cited

FOREIGN PATENT DOCUMENTS

| CN | 102169259 A | 8/2011 |
|---|---|---|
| CN | 102789100 A | 11/2012 |
| CN | 103278973 A | 9/2013 |
| CN | 103676362 A | 3/2014 |

OTHER PUBLICATIONS

First Office Action regarding Chinese application No. 201310701562.4, dated Sep. 6, 2015. Translation provided by Dragon Intellectual Property Law Firm.
Written Opinion of the International Searching Authority for international application No. PCT/CN2014/077983.
Third Office Action regarding Chinese application No. 201310701562.4, dated Jun. 29, 2016. Translation provided by Dragon Intellectual Property Law Firm.

* cited by examiner

LIQUID CRYSTAL GRATING SUBSTRATE, LIQUID CRYSTAL GRATING AND DISPLAY DEVICE

CROSS-REFERENCE TO RELATED APPLICATION

This application is the U.S. national phase of PCT Application No. PCT/CN2014/077983 filed on May 21, 2014, which claims a priority of the Chinese patent application No. 201310701562.4 filed on Dec. 18, 2013, which is incorporated herein by reference in its entirety.

TECHNICAL FIELD

The present disclosure relates to the field of display technology, in particular to a liquid crystal grating substrate, a liquid crystal grating and a display device.

BACKGROUND

Currently, for an existing liquid crystal grating, especially that used in an autostereoscopic 3D display device, a signal electrode and a common electrode inside it are usually charged bilaterally. FIG. 1 shows one grating substrate of the liquid crystal grating, which includes a base substrate 110, and common electrodes 120 and signal electrodes 130 arranged on the base substrate 110. Two ends of each common electrode 120 are connected to common electrode input lines 141, 142, respectively, so as to charge the common electrode 120. Two ends of each signal electrode 130 are connected to signal electrode input lines 151, 152, respectively, so as to charge the signal electrode 130.

The reason for such a configuration is that the signal electrode input lines 151, 152 and the common electrode input lines 141, 142 in the existing liquid crystal grating are all arranged at a region of a liquid crystal layer, i.e., at a sealant region 180. A ratio of a dielectric coefficient of air to that of liquid crystals is about 1:16, and in order to compensate for a high dielectric coefficient of a liquid crystal environment, it is required to use a metal line as the input line. In addition, in order to ensure the accuracy of signal transmission, it is required to provide the common electrode and the signal electrode with two input lines, respectively, so as to ensure a relatively high transmission frequency. As a result, it is able to charge the signal electrode and the common electrode bilaterally, thereby to ensure good charging effect and driving effect.

Because the common electrode and the signal electrode are provided with two input lines, respectively, the common electrode input lines 141, 142 and the signal electrode input lines 151, 152 need to be arranged at different layers. In addition, between the layers is arranged an insulating layer, in which via-holes are provided. The common electrode input lines 141, 142 are connected to the common electrode 120 through the via-hole 160 while the signal electrode input lines 151, 152 are connected to the signal electrode 130 through the via-hole 170, so as to prevent signal interference therebetween. However, the resultant liquid crystal grating substrate will be relatively thick, and the manufacturing difficulty and the production cost will increase.

SUMMARY

An object of the present disclosure is to reduce a thickness of a liquid crystal grating substrate, simplify its manufacturing process, and reduce the production cost.

In one aspect, the present disclosure provides a liquid crystal grating substrate, including a base substrate, and several bar-like signal electrodes and several bar-like common electrodes formed at an identical layer on the base substrate, the signal electrodes and the common electrodes being arranged alternately and parallel to each other. The liquid crystal grating substrate further includes a signal electrode input line connected to a first end of the signal electrode and a common electrode input line connected to a second end of the common electrode. Respective first ends of the signal electrode and the common electrode are arranged close to one side of the base substrate, respective second ends of the signal electrode and the common electrode are arranged close to the other side of the base substrate opposite to the side, and the signal electrode input line and the common electrode input line are arranged at a layer identical to the signal electrode.

The signal electrode, the common electrode, the signal electrode input line and the common electrode input line are made of an identical material.

The material is ITO or IZO.

The signal electrode, the common electrode, the signal electrode input line and the common electrode input line are formed by a single process.

The process is a masking process or an evaporating and etching process.

In another aspect, the present disclosure provides a liquid crystal grating, including the above-mentioned liquid crystal grating substrate, an opposite substrate arranged opposite to the liquid crystal grating substrate, and a liquid crystal layer sealed between the liquid crystal grating substrate and the opposite substrate. A side of the liquid crystal grating substrate provided with signal electrodes and common electrodes faces the liquid crystal layer, and a side of the opposite substrate facing the liquid crystal layer is provided with block-like electrodes.

A signal electrode input line and a common electrode input line are arranged outside a sealant for sealing the liquid crystal layer between the liquid crystal grating substrate and the opposite substrate.

In yet another aspect, the present disclosure provides a display device including a display panel and the above-mentioned liquid crystal grating arranged at a viewing side of the display panel.

The present disclosure has the following advantageous effects. According to the liquid crystal grating substrate of the present disclosure, the signal electrodes, the common electrodes, the signal electrode input line and the common electrode input line are arranged at an identical layer. In addition, the signal electrode is connected to the signal electrode input line so as to be charged unilaterally, and the common electrode is connected to the common electrode input line so as to be charged unilaterally too. Hence, it is unnecessary to provide an insulating layer as well as via-holes in the insulating layer. As a result, it is able to reduce a thickness of the liquid crystal grating substrate, simplify its manufacturing process, and reduce the production cost.

DETAILED DESCRIPTION

The present disclosure will be described hereinafter in conjunction with the drawings and the embodiments. The following embodiments are for illustrative purposes only, but shall not be used to limit the scope of the present disclosure.

First Embodiment

Figure 2:
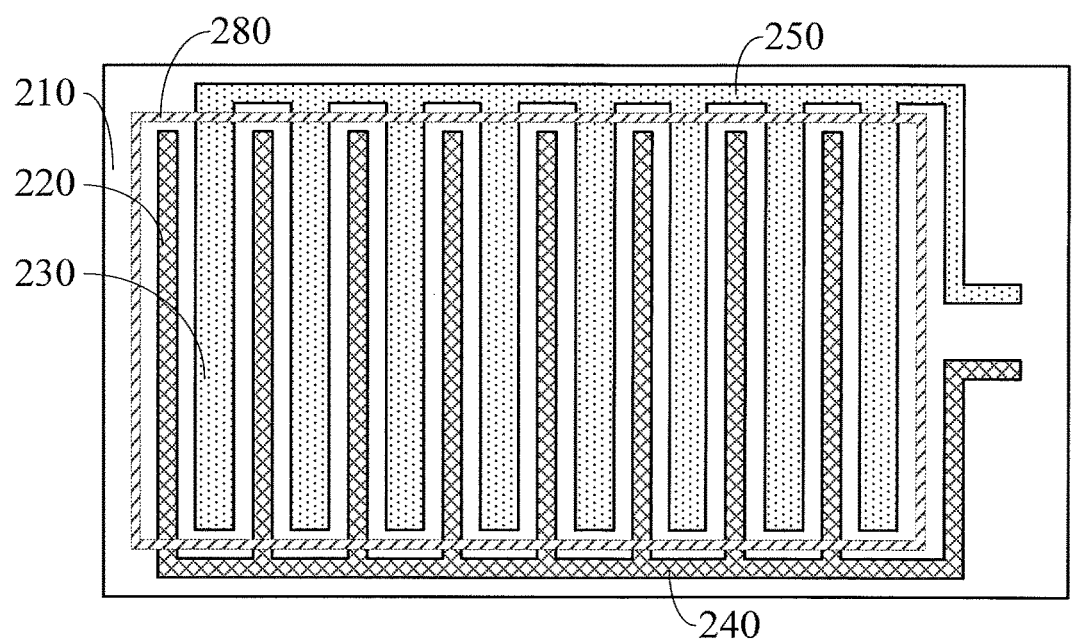
FIG. 2 is a planar view of a liquid crystal grating substrate according to one embodiment of the present disclosure.

As shown in FIG. 2, a liquid crystal grating substrate in this embodiment includes a base substrate 210, and several bar-like signal electrodes 230 and several bar-like common electrodes 220 arranged at an identical layer on the base substrate 210. The signal electrodes 230 and the common electrodes 220 are arranged alternately and parallel to each other. The liquid crystal grating substrate further includes a signal electrode input line 250 and a common electrode input line 240 configured to apply electrical signals to the signal electrodes 230 and the common electrodes 220, respectively.

In order to reduce a thickness of the liquid crystal grating substrate, the signal electrodes 230, the common electrodes 220, the signal electrode input line 250 and the common electrode input lines 240 are arranged at the same layer in this embodiment, so the signal electrode input line 250 is connected to the signal electrode 230 so as to charge it unilaterally, and the common electrode input line 240 is connected to the common electrode 220 so as to charge it unilaterally too. To be specific, the signal electrode input line 250 is connected to a first end of the signal electrode 230, and the common electrode input line 240 is connected to a second end of the common electrode 220. Respective first ends of the signal electrode 230 and the common electrode 220 are arranged close to an identical side of the base substrate 210, while respective second ends of the signal electrode 230 and the common electrode 220 are arranged close to a side of the base substrate 210 opposite to the identical side. In this way, it is able to ensure that the signal electrodes 230, the common electrodes 220, the signal electrode input line 250 and the common electrode input line 240 are arranged at the same layer, and the signal electrode input line 250 and the common electrode input line 240 do not intersect each other, i.e., patterns of the signal electrode 230 and the signal electrode input line 250 do not overlap, or are not in contact with, patterns of the common electrode 220 and the common electrode input line 240.

According to the liquid crystal grating substrate in this embodiment, the signal electrodes 230, the common electrodes 220, the signal electrode input line 250 and the common electrode input line 240 are arranged at the same layer. In addition, the signal electrode input line 250 is connected to the signal electrodes 230 so as to charge them unilaterally, and the common electrode input line 240 is connected to the common electrodes 220 so as to charge them unilaterally too. As compared with the prior art, it is unnecessary to provide an insulating layer as well as viaholes in the insulating layer. As a result, it is able to reduce a thickness of the liquid crystal grating substrate, simplify its manufacturing process, and reduce the production cost.

Because the signal electrodes 230, the common electrodes 220, the signal electrode input line 250 and the common electrode input line 240 are arranged at the same layer, they may be made of an identical material (usually a transparent electrode, e.g., ITO or IZO) so as to further reduce the process steps and save the materials. Alternatively, the signal electrodes 230, the common electrodes 220, the signal electrode input line 250 and the common electrode input line 240 are formed by a single process. The manufacturing process may include any known one, such as a masking process or an evaporating and etching process, which is not particularly defined herein.

Second Embodiment

Figure 3:
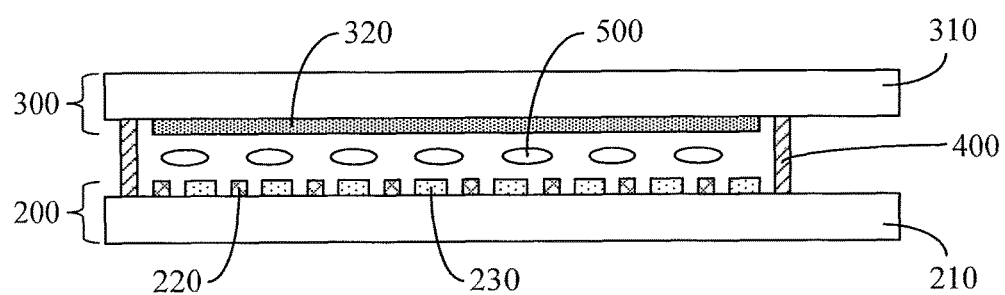
FIG. 3 is a schematic view showing a liquid crystal grating according to one embodiment of the present disclosure.

As shown in FIG. 3, a liquid crystal grating for 3D display in this embodiment includes the above-mentioned liquid crystal grating substrate 200 in the first embodiment, an opposite substrate 300 arranged opposite to the liquid crystal grating substrate 200, and a liquid crystal layer 500 sealed by a sealant 400 between the liquid crystal grating substrate 200 and the opposite substrate 300. The liquid crystal grating substrate 200 includes the base substrate 210, the bar-like signal electrodes 230 and the bar-like common electrodes 220 arranged on the base substrate 210, and the signal input lines connected to the signal electrodes 230 and the common electrodes 220. A side of the liquid crystal grating substrate 200 provided with the signal electrodes 230 and the common electrodes 220 faces the liquid crystal layer 500. The opposite substrate 300 includes a base substrate 310 and block-like electrodes 320 arranged on the base substrate 310, and a side of the opposite substrate 300 provided with the block-like electrodes 320 faces the liquid crystal layer 500.

During the operation, an identical voltage is applied to the common electrode 220 and the block-like electrode 320, and a voltage different from that applied to the common electrode 220 is applied to the signal electrode 230. Hence, liquid crystals at a region corresponding to the common electrode 220 and the block-like electrode 320 will not be deflected (for a normally-white mode, this region is transparent), while the liquid crystals at a region corresponding the signal electrode 230 and the block-like electrode 320 will be deflected (for a normally-black mode, this region is nontransparent). As a result, it is able to form the transparent and nontransparent strips alternately, thereby to achieve the 3D display.

Due to the use of the liquid crystal grating substrate in the first embodiment, the liquid crystal grating also has such advantages as small thickness, simple manufacturing process and low production cost as compared with the prior art.

As shown in FIG. 2, in this embodiment, the signal electrode input line 250 and the common electrode input line 240 are arranged outside a sealant (sealant region 280 in FIG. 2) for sealing the liquid crystal layer between the liquid crystal grating substrate and the opposite substrate. The signal electrode input line 250 and the common electrode input line 240 are arranged outside the sealant, i.e., the they are not covered by the region of the liquid crystal layer, and a ratio of a dielectric coefficient of air to that of liquid crystals is about 1:16. As a result, it is able to drive liquid crystal molecules even when metal lines are replaced with the signal electrode input line 250 and the common electrode input line 240 which are made of ITO, and when common electrode and the signal electrode are charged unilaterally, thereby to form a grating structure normally.

Figure 1:
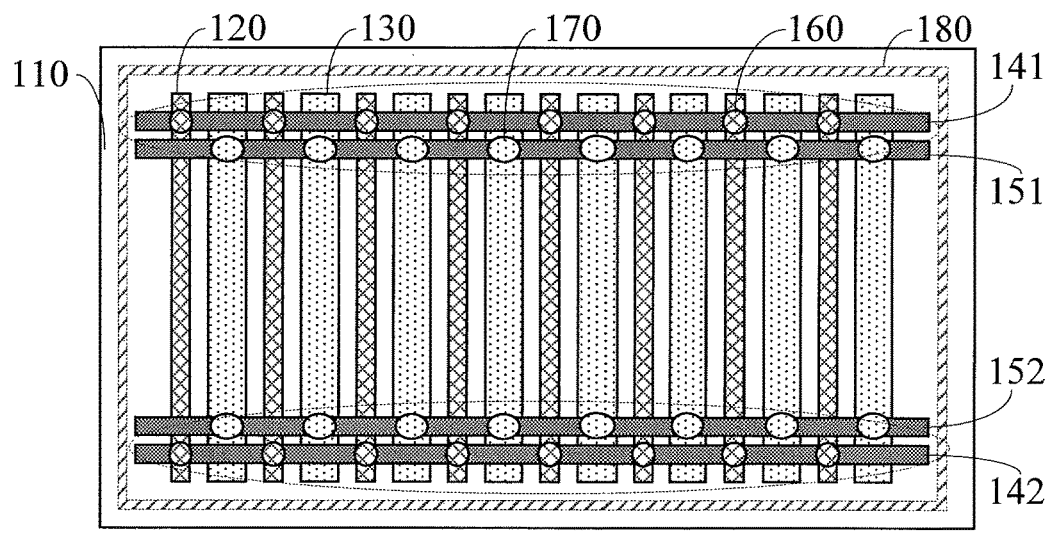
FIG. 1 is a planar view of an existing liquid crystal grating substrate.

In addition, the common electrode input lines 141, 142 and the signal electrode input lines 151, 152 are arranged within the sealant as shown in FIG. 1. Due to a large dielectric coefficient of the liquid crystals, it is required to use metal lines as the input lines. This will result in the occurrence of signal crosstalk at elliptical portions shown in FIG. 1, and as a result, the deflection of the liquid crystals at the periphery will be adversely affected, and an edge display effect will be deteriorated. However, in this embodiment, the signal electrode input line 250 and the common electrode input line 240 are arranged outside the sealant for sealing the liquid crystal layer between the liquid crystal grating substrate and the opposite substrate, and the liquid crystal molecules are packaged within the sealant. As a result, it is able to prevent the presence of the liquid crystal molecules at regions where the signal electrode input line 250 and the common electrode input line 240 are arranged close to the signal electrodes 230 and the common electrodes 220, respectively (there will exist crosstalk somewhat at these regions). As compared with the prior art, it is able to prevent the liquid crystal molecules at the periphery of the liquid crystal layer from being deflected abnormally, thereby to provide a better edge display effect.

For example, for the liquid crystal grating used in a 55-inch display panel, its layer of electrodes charged unilaterally is made of an ITO material, and its parameters are described as follows.

The signal electrode 230 is made of an ITO material with a length of 702.45 mm, a width of 0.3374 mm and a thickness of 400 Å, and has a resistance R of 0.1353 MΩ, a total capacitance C of 11685.55 pF, and a delay time (R*C) of 1.58 ms.

The common electrode 220 is made of an ITO material with a length of 701.741 mm, a width of 0.0743 mm and a width of 400 Å, and has a resistance R of 0.6139 MΩ, a total capacitance C of 2307.18 pF, and a delay time (R*C) of 1.42 ms.

The signal electrode input line 250 and the common electrode input line 240 are each made of an ITO material with a length of 1230 mm, a width of 0.1 mm and a thickness of 400 Å, and each have a resistance R of 0.7993 MΩ, a total capacitance C of 363.14 pF and a decay time (R*C) of 0.29 ms.

Third Embodiment

A display device in this embodiment includes a display panel and the above-mentioned liquid crystal grating arranged at a viewing side of the display panel. Usually, the liquid crystal grating is adhered onto a viewing-side surface of the display panel by an adhesion process. The display device may be any product or member having a display function, such as a mobile phone, a flat panel PC, a TV, a display, a laptop PC, a digital photo frame and a navigator.

The above embodiments are for illustrative purposes only, but shall not be used to limit the present disclosure. A person skilled in the art may make further alterations and modifications without departing from the spirit of the present disclosure. Hence, all equivalents also fall within the scope of the present disclosure, and the scope of the present disclosure shall be subject to the appended claims.

What is claimed is:

1. A liquid crystal grating, comprising:
a liquid crystal grating substrate, including a base substrate, and several bar-like signal electrodes and several bar-like common electrodes formed at an identical layer on the base substrate, the signal electrodes and the common electrodes being arranged alternately and parallel to each other, the liquid crystal grating substrate further comprising a signal electrode input line and a common electrode input line, wherein the signal electrode input line is connected to a first end of the signal electrode, the common electrode input line is connected to a second end of the common electrode, respective first ends of the signal electrode and the common electrode are arranged close to one side of the base substrate, respective second ends of the signal electrode and the common electrode are arranged close to the other side of the base substrate opposite to the side, and the signal electrode input line and the common electrode input line are arranged at a layer identical to the signal electrode;
an opposite substrate arranged opposite to the liquid crystal grating substrate; and
a liquid crystal layer sealed between the liquid crystal grating substrate and the opposite substrate;
wherein a side of the liquid crystal grating substrate provided with signal electrodes and common electrodes faces the liquid crystal layer, and a side of the opposite substrate facing the liquid crystal layer is provided with a block-like electrode,
wherein the signal electrode input line and the common electrode input line are arranged outside a sealant for sealing the liquid crystal layer between the liquid crystal grating substrate and the opposite substrate.

2. A display device, comprising:
a display panel; and
the liquid crystal grating according to claim 1 and arranged at a viewing side of the display panel.

3. The display device according to claim 2, wherein the signal electrode, the common electrode, the signal electrode input line and the common electrode input line are made of an identical material.

4. The display device according to claim 3, wherein the material is ITO or IZO.

5. The liquid crystal grating according to claim 1, wherein the signal electrode, the common electrode, the signal electrode input line and the common electrode input line are made of an identical material.

6. The liquid crystal grating according to claim 5, wherein the material is ITO or IZO.

7. The liquid crystal grating according to claim 1, wherein the signal electrode, the common electrode, the signal electrode input line and the common electrode input line are formed by a single process.

8. The liquid crystal grating according to claim 7, wherein the process is a masking process or an evaporating and etching process.

9. The display device according to claim 2, wherein the signal electrode, the common electrode, the signal electrode input line and the common electrode input line are formed by a single process.

10. The display device according to claim 9, wherein the process is a masking process or an evaporating and etching process.

* * * * *